United States Patent
Abe

[11] Patent Number: 5,987,020
[45] Date of Patent: Nov. 16, 1999

[54] INTERMITTENT TRANSMISSION CONTROL SYSTEM

[75] Inventor: Masami Abe, Tokyo, Japan

[73] Assignee: Oki Electric Industry Co., Ltd., Tokyo, Japan

[21] Appl. No.: 08/818,996

[22] Filed: Mar. 17, 1997

[30] Foreign Application Priority Data

May 21, 1996 [JP] Japan ............................ 8-125235

[51] Int. Cl.⁶ .................................................. H04B 7/212
[52] U.S. Cl. ........................................ 370/347; 370/345
[58] Field of Search .................................. 370/310, 321, 370/336, 337, 347, 350, 464, 522; 455/463

[56] References Cited

U.S. PATENT DOCUMENTS

| 5,596,678 | 1/1997 | Wigren et al. | 395/237 |
| 5,644,621 | 1/1997 | Yamashita et al. | 455/463 |
| 5,757,788 | 5/1998 | Tatsumi et al. | 370/336 |

Primary Examiner—Huy D. Vu
Assistant Examiner—Alexander Boakye
Attorney, Agent, or Firm—Venable; Robert J. Frank

[57] ABSTRACT

An intermittent transmission control system based on a TDMA system which involves a burst transmission, has a sound presence detector for detecting presence or absence of sound information to be transmitted on the basis of an aural signal input from a microphone; a switch unit for switching types of the burst transmission; and a call control processor for causing the switch unit to switch the types of the burst transmission in such a way that a normal burst transmission containing the sound information is performed if presence of the sound information is detected by the sound presence detector, whereas a reduced burst transmission containing time interval information of the burst transmission is performed if no burst transmission is performed for a predetermined time. The call control processor also causes the switch unit to switch the types of the burst transmission in such a way that the normal burst transmission containing Fast Associated Control Channel information is performed.

9 Claims, 4 Drawing Sheets

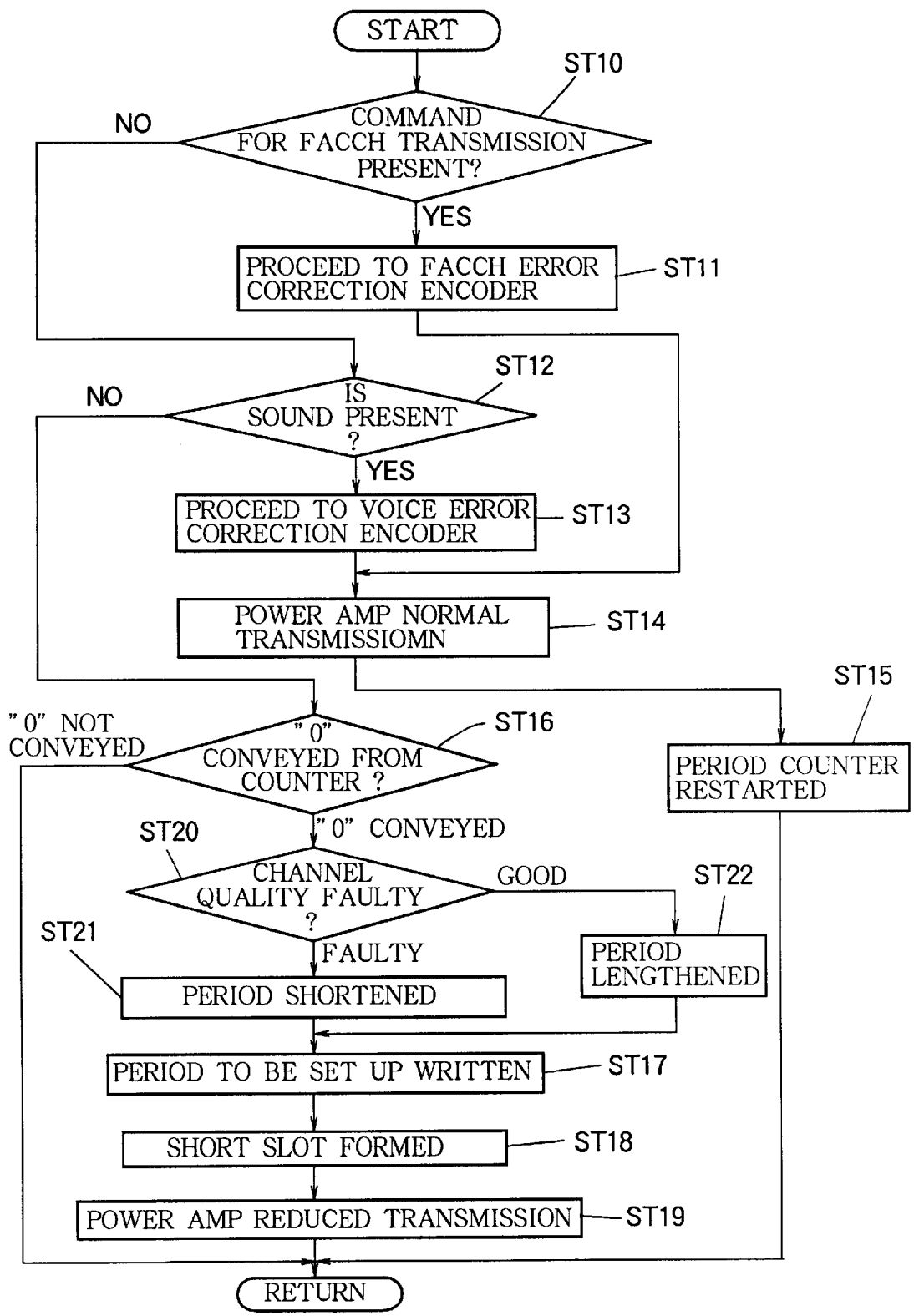

INTERMITTENT TRANSMISSION CONTROL SYSTEM

BACKGROUND OF THE INVENTION

The present invention relates to an intermittent transmission control system as may be used in a cellular portable telephone system or the like, and more particularly, to an intermittent transmission control system useable in a communication system which involves a burst transmission.

The current digital radio portable terminal such as a personal handy phone system (PHS), which is a personal communications services in Japan, for example, employs 1.9 GHz band as a frequency band, a carrier spacing of 300 kHz, an access scheme which has four channel multiplexed multi-carrier TDMA (Time Division Multiple Access), and a transmission scheme of TDD (Time Division Duplex). With this access scheme and transmission scheme, a signal on a single frequency is divided into eight slots per five milliseconds, for example, with four slots assigned to each of a down-link communication (from the base station to the terminal) and an up-link communication (from the terminal to the base station). This allows four bilateral communication channels to be simultaneously established on a single carrier.

Data is transmitted between the terminal and the base station by utilizing π/4 shift QPSK (Quadrature Phase Shift Keying) and a voice coding scheme which includes a compression encoding of a PCM aural signal from a rate of 64 kbit/second to a rate of 32 kbit/second according to the ADPCM (Adaptive Differential Pulse Code Modulation) system.

A carrier frequency is divided into a control and a communication section with the control carrier being always shared by different terminals. As for the communication carrier section, each time a terminal requires a communication, the terminal identifies and uses an empty carrier and an empty slot, and whenever a radio interference occurs, the communication is shifted to another carrier and/or slot to avoid the interference.

For a communication in either a TDMA cellular system as employed in Japan and the United States in which one channel is allocated to each of the down-link and the up-link or a multi-carrier TDMA system as adopted for PHS in which a channel is allocated to a combined up—and down-link, there is a need for a burst control at a given timing upon initiation of a transmission and for a power saving during the non-transmission interval (standby time).

For example, by turning a pin switch within a radio unit on/off at a given timing, a burst control of an output signal from a mixer is achieved, and the output signal is then passed through a transmit/receive switch, a bandpass filter or the like to be radiated from an antenna. In this instance, during the non-transmission interval (or standby time), the gate voltage of a transmission power amplifier is controlled so as to suppress the drain current of a transistor in the amplifier, thus achieving a power saving.

Moreover, it is generally known that a reduction in the power consumption is enabled in the TDMA system by performing a burst transmission on the side of a mobile station only when the sound presence is detected in the sound presence or absence detecting process, i.e., the presence of sound input from the microphone is detected However, with the conventional intermittent transmission control system as mentioned, there has been a difficulty experienced by a burst receiver of the base station, monitoring the arrival of a burst, in determining whether a failure of arrival of the burst is due to the fact that the voice from the mobile station is silent, to a degradation in the quality of a radio channel (as caused by a fading, the mobile station being located behind a building or a reduction in the level of electric field because the mobile station is far removed from the base station) or a result of failure of resynchronization upon hand-off. This means that the base station takes long time in rendering a determination as to whether a mobile station is still receiving a transmission from the base station.

In addition, a difficulty is sometimes experienced in the reception of aburst by the base station when a silent interval is long lasting. Specifically, there has been a problem that difficulties are presented in achieving AGC (Automatic Gain Control), AFC (Automatic Frequency Control) and a burst location.

SUMMARY OF THE INVENTION

It is an object of the present invention to provide an intermittent transmission control system which allows a base station to identify the presence of a mobile station (or that a mobile station is receiving a down-link) in a facilitated manner, thus facilitating the reception of a burst which is intermittently transmitted from the mobile station.

According to the present invention, an intermittent transmission control system based on a TDMA system which involves a burst transmission, has: a sound presence detector for detecting presence or absence of sound information to be transmitted on the basis of an aural signal; a switch unit for switching types of the burst transmission; and a control processor for causing the switch unit to switch the types of the burst transmission in such a way that a normal burst transmission containing the sound information is performed if presence of the sound information is detected by the sound presence detector, whereas a reduced burst transmission containing time interval information of the burst transmission is performed if no burst transmission is performed for a predetermined time.

The control processor also causes the switch unit to switch the types of the burst transmission in such a way that the normal burst transmission containing Fast Associated Control Channel information is performed.

The intermittent transmission control system may further comprises: a voice encoder for compression encoding the aural signal; a period counter which operates with a period which is established by the switch unit; an FACCH error correction encoder for performing an error correction encoding for Fast Associated Control Channel; a voice error correction encoder for performing an error correction encoding for the aural signal; and a slotting unit for applying a slot interleave conversion and a TDMA slotting operation to signals for which the error correction encoding for Fast Associated Control Channel has been performed by the FACCH error correction encoder and for which the error correction encoding for the aural signal has been performed by the voice error correction encoder.

The intermittent transmission control system may further comprises: a receiver for receiving a radio signal; and a quality evaluation unit for evaluating quality of said received signal. The control processor changes the predetermined time on the basis of a result of evaluation by the quality evaluation unit, thereby changing the time interval between the reduced burst transmissions.

Accordingly, presence or absence of the mobile station can be confirmed easily by the base station, thus facilitating the reception by the base station of bursts which are intermittently transmitted.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 4 is a flow chart illustrating the operation of the intermittent transmission control system of FIG. 3.

DETAILED DESCRIPTION OF THE INVENTION

Further scope of applicability of the present invention will become apparent from the detailed description given hereinafter. However, it should be understood that the detailed description and specific examples, while indicating preferred embodiments of the invention, are given by way of illustration only, since various changes and information will become apparent to those skilled in the art from the detailed description.

An intermittent transmission control system according to the present invention is applicable as an intermittent transmission control system which is used in a cellular portable telephone system or the like.

Figure 1:
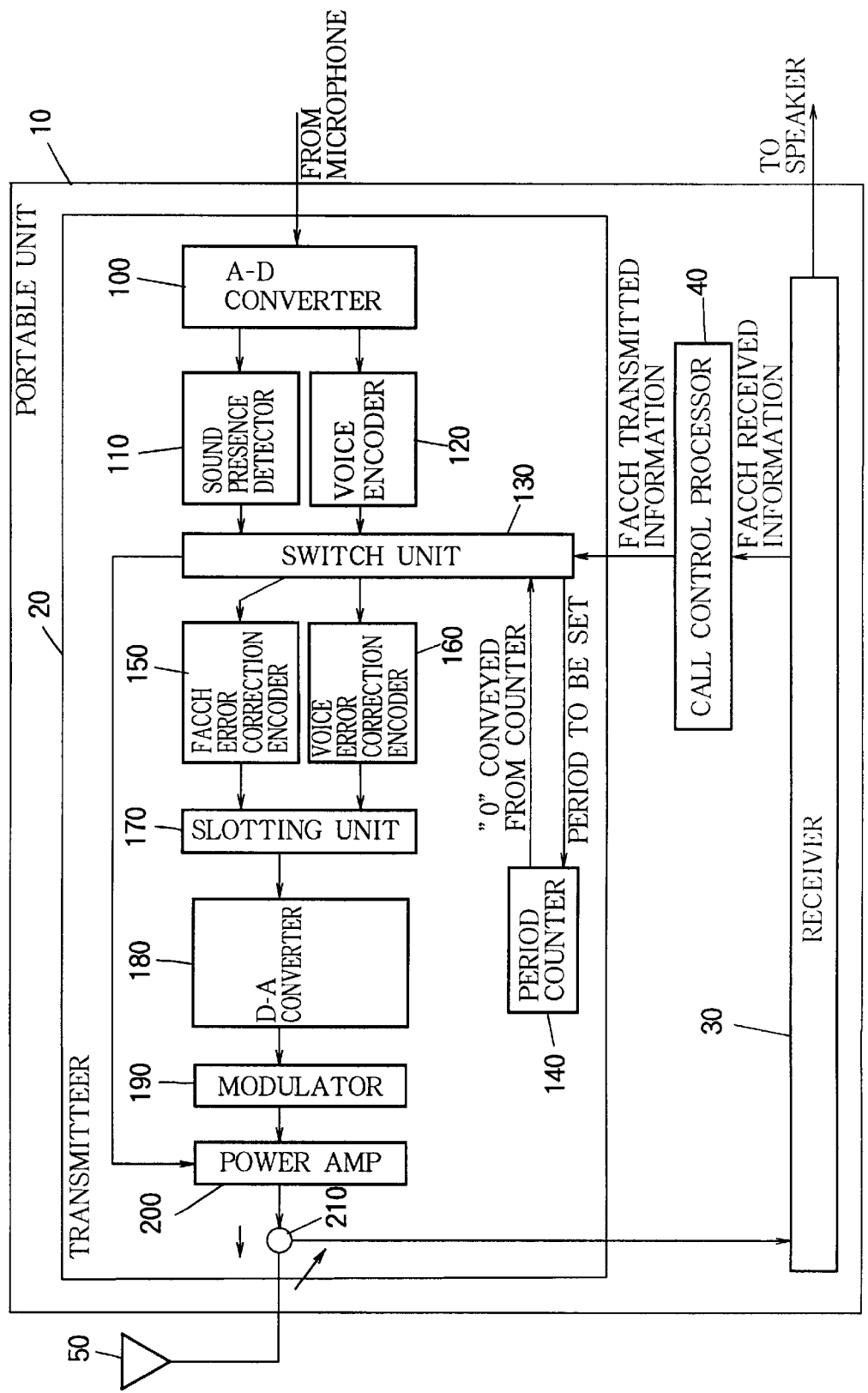
FIG. 1 is a block diagram showing a construction of an intermittent transmission control system according to a first embodiment of the present invention.

Referring to FIG. 1, a portable unit 10 as an intermittent transmission control system has a transmitter 20 in which an aural signal input from a microphone is modulated into a transmit/receive radio frequency (RF) carrier so as to be radiated from an antenna 50, a receiver 30 for receiving a signal in the transmit/receive radio frequency (RF) band which is fed from the antenna 50, a call control processor 40 which controls a set-up or release of the call and hand-off and which commands the transmitter 20 to transmit an FACCH (Fast Associated Control Channel) as required, and the transmit/receive antenna 50.

The transmitter 20 includes an analog to digital converter (A-D converter) 100, a sound presence detector 110, a voice encoder 120, a switch unit 130, period counter 140, an FACCH error correction encoder 150, a voice error correction encoder 160, a slotting unit 170, a digital to analog converter (D-A converter) 180, a modulator 190, a power amplifier 200 and a circulator 210.

The A-D converter 100 samples an aural signal which is input from a microphone and delivers a corresponding sample to the sound presence detector 110 and the voice encoder 120.

The sound presence detector 110 detects presence or absence of sound information to be transmitted on the basis of the aural signal from the A-D converter 100. In other words, the sound presence detector 110 determines whether the aural signal is in the sound presence state when the sound information to be transmitted is present or in a silent state when the sound information to be transmitted is absent.

The voice encoder 120 provides a compression encoding of the aural signal. Specifically, the compression takes place by encoding the PCM aural signal which is fed from the A-D converter 100 into a VSELP aural signal, and the compressed data is delivered to the switch unit 130.

The switch unit 130 switches types of transmission between the encoded voice and FACCH. The switch unit 130 also switches types of transmission between a power amplifier normal transmission in which a control signal is delivered to the power amplifier 200 to establish a normal transmission time during which the power amplifier 200 is turned on and a power amplifier reduced transmission in which a reduced transmission time is established during which the power amplifier 200 is turned on.

In the TDMA cellular system which prevails in Japan and the United States, a recommendation is defined for the provision of SACCH (Slow Associated Control Channel) and FACCH (Fast Associated Control Channel). SACCH is a channel in which control information is divided into a plurality of slots, thus transmitting information in a finely divided manner and thus requiring an increased length of time, greater than 40 ms, until the entire information is completely transmitted. The name "Slow" derives from this fact. Hence, this channel has no adverse influence upon the voice quality. On the other hand, FACCH transmits information by utilizing (or stealing) an information domain in voice slots which are to be used for the intended transmission. While it is susceptible to a degradation of the voice quality, it exhibits a feature that the transmission of information takes place more rapidly (40 ms) as compared with SACCH. The two types of the control information are selectively used depending on the importance of transmitting the information rapidly.

The period counter 140 operates with a period which is established by the switch unit 130.

The FACCH error correction encoder 150 performs an error correction encoding for FACCH by effecting an error correction CRC (Cyclic Redundancy Check) coefficients calculation, a convolution encoding and an interleave conversion.

The voice error correction encoder 160 performs an error correction encoding for the voice, which takes place by applying an error correction CRC to an output from the switch unit 130, for example. An error in data transmitted is detected by the analysis of CRC in the receiver 30. This voice error correction encoder 160 permits not only an error in a random code, but also aburst error to be detected, and also enables an error correction.

The slotting unit 170 performs a slot interleave operation according to the TDMA cellular system and a slotting operation. The slotting unit 170 adds control data to voice data which is transferred from the FACCH error correction encoder 150 and the voice error correction encoder 160 to form data to be transmitted, which is then scrambled and delivered at a given timing, namely, inserted into a slot in a frame which is allocated to the particular terminal for transmission. By way of example, a basic period is defined by a TDMA frame of a given length, which may be equal to 40 ms=1,680 bits, which constitute six slots. The frame may include a pair of subframes. Thus, the frame defines three pairs of temporal positions or slots, and data to be transmitted is inserted into a selected slot which is allocated to a particular mobile station. To avoid a conflict of this signal with other signals, the temporal position of such slot is controlled, which is referred to as a burst synchronization control.

The D-A converter 180 converts a train of digital bits into $\pi/4$ QPSK baseband signal, and forms part of a baseband interface.

For purpose of modulation, the baseband signal is introduced into the modulator 190, which may comprise a PLL synthesizer, a bandpath filter or the like.

The power amplifier 200 linearly amplifies the modulated baseband signal, and includes a pin switch which allows the power amplifier to be turned on and off in accordance with a control signal from the switch unit 130 to provide a burst control of a signal which is delivered from the amplifier 200.

A combination of the modulator 190, the power amplifier 200 and the circulator 210 forms together an RF assembly 220 which modulates the baseband signal into an RF signal and delivers it.

To recapitulate, the portable unit 10 according to the first embodiment has the transmitter 20, which has the A-D converter 100 which samples an aural signal and converts it into a digital signal, the sound presence detector 110 which detects presence or absence of sound in the aural signal, the voice encoder 120 which provides a compression encoding of the aural signal, the switch unit 130 which switches between the transmission of the compression encoded aural signal and FACCH information, the period counter 140 which operates with a period determined by the switch unit 30, the FACCH error correction encoder 150 which effects an error correction encoding for FACCH, the voice error correction encoder 160 which effects an error correction encoding for the voice, the slotting unit 170 which performs a slot interleave conversion and TDMA slotting operation upon the signal which is subjected to an error correction encoding by either encoder 150 or 160, the D-A converter 180 which converts a train of digital bits delivered from the slotting unit 170 into a π/4 QPSK baseband signal, and the RF assembly 190 which modulates the baseband signal into the RF signal and delivers it. In addition, the portable unit 10 has the receiver 30 for receiving a radio signal to which either the voice or FACCH is allocated and the call control processor 40 which supplies control information and a permissible waiting time as a command to the switch unit 130.

While the sound presence detector 110 and the voice encoder 120 are shown as being arranged parallel to each other in FIG. 1, they may be arranged in a serial sequence of the A-D converter 100, the sound presence detector 110 and the voice encoder 120. Alternatively, the positions of the sound presence detector 110 and the voice encoder 120 may be interchanged in the serial sequence.

The operation of the transmitter 20 of the portable unit 10, constructed in the manner mentioned above, will be described below.

An aural signal input from the microphone is sampled by the A-D converter 100, which delivers a corresponding digital aural signal to the sound presence detector 110 and the voice encoder 120. In the voice encoder 120, the aural signal is subjected to a compression encoding. For example, a voice compressed signal which is encoded into blocks each having a period of 20 ms, for example, may be delivered. The sound presence detector 110 determines whether the aural signal is in the sound presence state or in the silent state on the basis of the digital aural signal from A-D converter 100, and a result of determination is transmitted to the switch unit 130.

It is assumed that the period, with which the sound presence state is detected, is chosen to be the same as the period used in the block encoding of the aural signal or an integral multiple thereof. The detection of the sound presence state is based on the power level calculation, but the beginning or the end of a word may be processed by any technique.

The call control processor 40 conveys FACCH information to be transmitted and a permissible waiting time (or a permissible number of waiting slots) to the switch unit 130.

Figure 2:
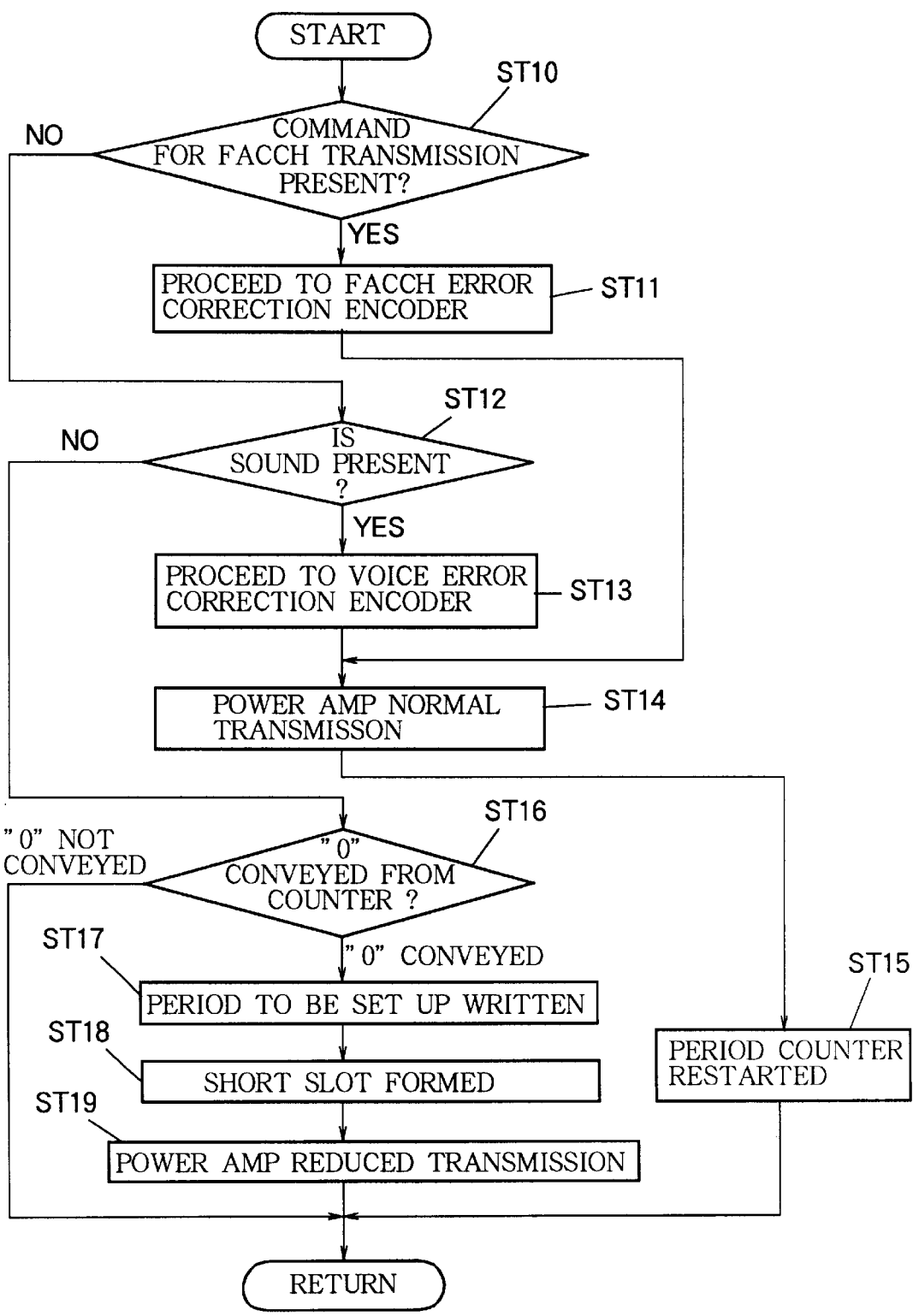
FIG. 2 is a flow chart illustrating the operation of the intermittent transmission control system of FIG. 1.

FIG. 2 is a flow chart illustrating the operation of the switch unit 130 of the transmitter 20. A program shown is started every 20 ms. It is to be noted that in this figure, ST represents a step of the program.

Initially, it is determined at step ST10 whether or not there is a command concerning the transmission of FACCH from the call control processor 40. When such command is present, the operation is directed to the FACCH error correction encoder 150 at step ST11, whereupon the operation proceeds to step ST14.

When it is found at step ST10 that there is no command for FACCH transmission from the call control processor 40, a flag, representing a result of determination rendered concerning whether or not the sound presence state is detected, is examined at step ST12. If the flag indicates the sound presence state, the operation proceeds to step ST13 where the operation is switched to the voice error correction encoder 160, whereupon the operation proceeds to step ST14.

At step ST14, a power amplifier normal transmission is established in which a normal transmission time is set up during which the power amplifier 200 is turned on. At step ST15, the period counter 140 is restarted, thus completing one pass through the program.

On the other hand, if it is found as a result of the examination of the flag at step ST12 that the silent state is detected, the operation proceeds to step ST16 where it is determined whether "0" is conveyed from the period counter 140.

In the event there is "0" conveyed from the period counter 140, the operation proceeds to step ST17 where a preset period is written into the period counter 140, and at step ST18, a short slot is formed in accordance with a preset period. At step ST19, a reduced transmission time during which the power amplifier 200 is turned on is set up for the power amplifier reduced transmission, whereupon the program is completed.

It is to be noted that when it is found at step ST16 that there is no "0" conveyed from the period counter 140, the program is then completed.

In this manner, the switch unit 130 determines the type of the intermittent transmission in which a normal burst is transmitted during a transmission time for control information when the sound presence state is detected, while when the no-transmission interval exceeds a preset value, a reduced burst containing transmission time interval information is transmitted.

Returning to FIG. 1, the FACCH error correction encoder 150 performs the calculation of CRC coefficients for error detection, a convolution encoding and an interleave conversion, as mentioned previously. The voice error correction encoder 160 also performs a calculation of CRC coefficience for error detection, a convolution encoding and an interleave conversion. Periods which are set up for the error detection, error correction and interleave conversion which are used in the both encoders 150 and 160 may be determined in a suitable manner.

The slotting unit 170 performs a slot interleave conversion and TDMA slotting operation. In the slotting operation, sync pattern, SACCH and CDVCC (Coded Digital Verification Color Code), which is an identifier imparted by the base station upon establishing a call, are added to the error corrected information.

The D-A converter 180 converts the bit train formed by the slotting unit 170 into a π/4 QPSK baseband signal, which is modulated by the RF assembly 220 to be transmitted into the air through the antenna 50.

As described, in the portable unit 10 according to the first embodiment, the intermittent transmission is switched such that a normal burst is transmitted during a transmission interval for control information when the sound presence state is detected, and when a non-transmission interval exceeds a preset value, a reduced burst containing transmission time interval information is transmitted. Accordingly, it is a simple matter to identify the presence of a mobile station which continues to receive a down-link on the part of the base station, also facilitating the reception of bursts which are intermittently transmitted. This improves the effectiveness of AGC control, AFC control and burst location during the reception of bursts.

As a consequence, if the intermittent transmission control system which exhibits such excellent features is used to a portable radio terminal for a communication system in which an information domain for the voice slot is used (or stolen) to transmit or receive control information, the base station is enabled to achieve the information transmittal with an improved accuracy and more rapidly.

Figure 3:
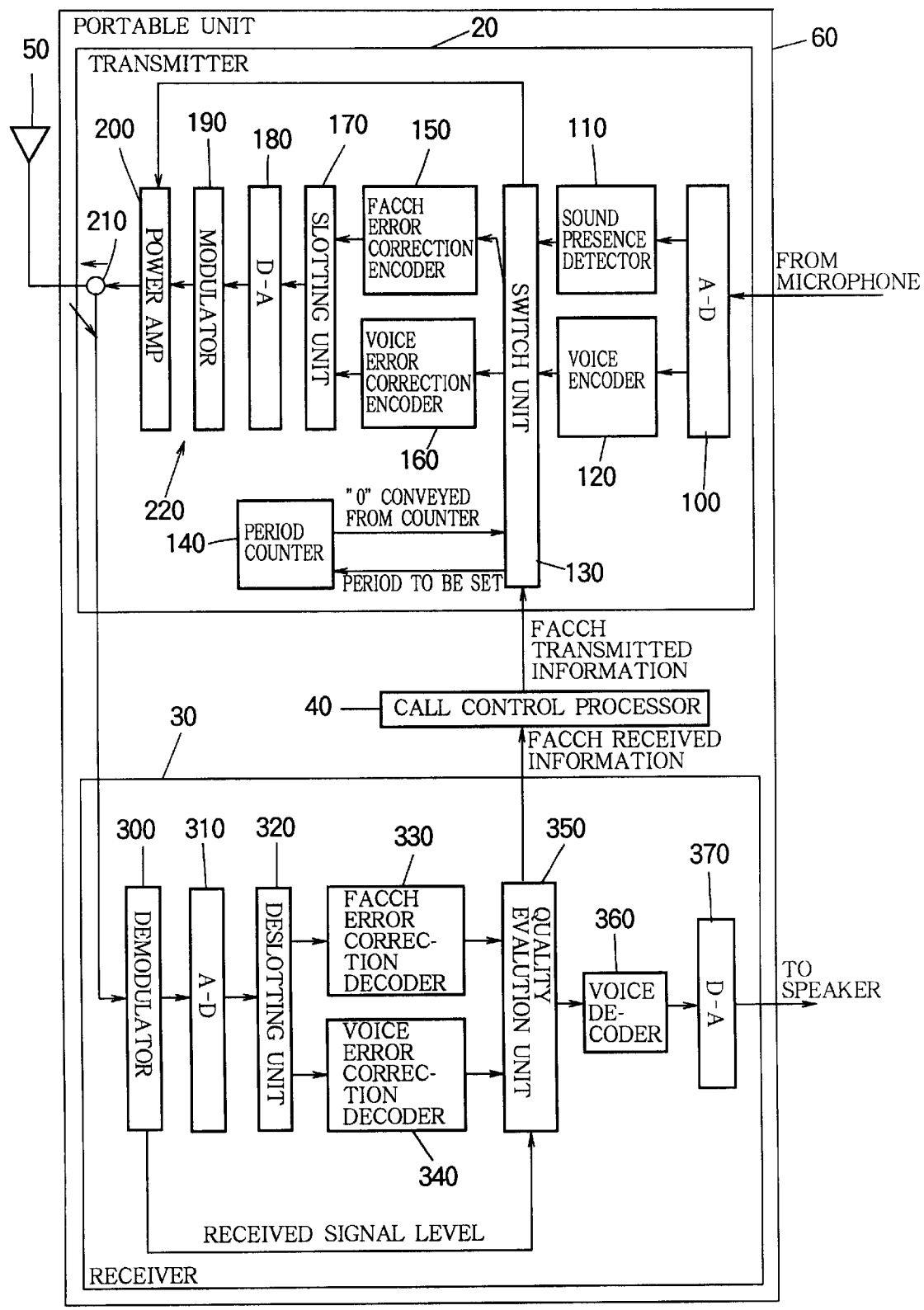
FIG. 3 is a block diagram showing a construction of an intermittent transmission control system according to a second embodiment of the present invention.

FIG. 3 is a block diagram showing a construction of an intermittent transmission control system according to a second embodiment of the present invention. The intermittent transmission control system shown in FIG. 3 is also applicable to a portable unit for a cellular portable telephone system or the like. It is to be noted that in the description to follow, parts which are identical to those shown in the device of FIG. 1 are designated by the same numerals and characters as before, without repeating a corresponding description.

Referring to FIG. 3, a portable unit 60 as an intermittent transmission control system has a transmitter 20 in which an aural signal which is input from a microphone is modulated into a transmit/receive radio frequency (RF) carrier to be radiated from the antenna 50, the receiver 30 for receiving a signal in the RF band which is fed from the antenna 50, the call control processor 40 which controls a set-up and release of a call, a hand-off or the like and which commands the transmitter 20 to transmit FACCH as required, and the transmit/receive antenna 50.

The transmitter 20 includes an A-D converter 100, a sound presence detector 110, a voice encoder 120, a switch unit 130, a period counter 140, an FACCH error correction encoder 150, a voice error correction encoder 160, a slotting unit 170, a D-A converter 180, a modulator 190, a power amplifier 200 and a circulator 210.

The A-D converter 100 samples an aural signal which is input from the microphone and delivers a corresponding sample to the sound presence detector 110 and the voice encoder 120.

The sound presence detector 110 determines whether the aural signal input from the A-D converter 100 is in the sound presence state or in the silent state.

The voice encoder 120 provides a compression encoding of the aural signal, which takes place by encoding a PCM aural signal fed from the A-D converter 100 into a VSELP aural signal, and delivers the compressed signal to the switch unit 130.

The switch unit 130 switches types of transmission between the encoded aural signal and FACCH. The switch unit 130 also switches types of transmission between a power amplifier normal transmission in which a control signal is applied to the power amplifier 200 to establish a normal transmission time during which the power amplifier 200 is turned on and a power amplifier reduced transmission in which a reduced transmission time is established during which the power amplifier 200 is turned on. However, in the second embodiment, the switch unit 130 operates to provide a variable transmission time interval in accordance with the signal level of a received waveform, a bit error rate and a frame error rate.

The period counter 140 operates with a period which is established by the switch unit 130.

The FACCH error correction encoder 150 performs an error correction encoding for FACCH, which takes place by effecting a calculation of CRC coefficience for error detection, a convolution encoding and an interleave conversion.

The voice error correction encoder 160 performs an error correction encoding for the aural signal, which may take place, for example, by applying an encoding to an output from the switch unit 130 according to the error detection CRC.

The slotting unit 170 performs a slot interleave operation according to the TDMA cellular system and a slotting operation.

The D-A converter 180 converts a train of digital bits into a π/4 QPSK baseband signal, and forms part of a baseband interface. The modulator 190 is used to modulate the baseband signal, and may comprise a PLL synthesizer, a bandpass filter or the like, for example.

The power amplifier 200 linearly amplifies the modulated baseband signal, and includes a pin switch which is turned on and off by a control signal supplied from the switch unit 130 to provide a burst control of an output signal from the transmitting power amplifier 200.

A combination of the modulator 190, the power amplifier 200 and the circulator 210 forms together an RF assembly 220 which modulates the RF carrier with the baseband signal and delivers it for transmission.

While the sound presence detector 110 and the voice encoder 120 are shown as being arranged in parallel relationship with each other in FIG. 3, they may be arranged in a serial sequence of A-D converter 100, sound presence detector 110 and voice encoder 120. Alternatively, the order of the sound presence detector 110 and the voice encoder 120 may be interchanged in the serial sequence.

The call control processor 40 conveys FACCH information to be transmitted, a permissible waiting time (or a permissible number of waiting slots) and a result of evaluation of the quality of a decoded signal to the switch unit 130.

On the other hand, the receiver 30 includes a demodulator 300, an A-D converter 310, a deslotting unit 320, an FACCH error correction decoder 330, a voice error correction decoder 340, a quality evaluation unit 350, a voice decoder 360 and a D-A converter 370.

The demodulator 300 receives a signal in the RF band which is fed from the antenna 50, and demodulates an aural signal received by the antenna 50. The A-D converter 310 converts a resulting baseband signal into a digital signal.

The deslotting unit 320 derives a slot from received data (frame) at a given timing, descrambles it, and derives an original data from the slot format, control data being fed to the FACCH error correction decoder 330 and the voice data being fed to the voice error correction decoder 340.

The FACCH error correction decoder 330 performs an error correction decoding of the received control information FACCH, which takes place by effecting a calculation of CRC coefficients for the error detection, a convolution decoding and a de-interleave conversion.

The voice error correction decoder 340 performs an error correction decoding for the received voice data, which may take place, for example, by applying an error detecting CRC decoding to an output from the deslotting unit 320.

Both the FACCH error correction decoder 330 and the voice error correction decoder 340 perform an encoding according to the error detecting CRC. They also detect an error in the data transmitted by the analysis of CRC. This FACCH error correction decoder 330 allows not only an error in a random code, but also an error in a burst to be detected, and also enables an error correction.

The quality evaluation unit 350 evaluates the quality of a decoded signal from the both decoders 330 and 340, and delivers a result of evaluation to the call control processor 40.

As a technique to evaluate the quality, 1) monitoring CRC coefficience of a decoded signal, 2) encoding the decoded signal again and monitoring the number of bit errors, 3) monitoring a received signal level, or a combination of 1) to 3) is contemplated.

The voice decoder 360 may decode the VSELP aural signal fed from the quality evaluation unit 350 (which may be 7.95 kbps, for example) into a PCM aural signal (which may be 8 bit×8 kHz=64 kbps), thus expanding it to be delivered as an output.

The D-A converter 370 converts the digital signal which is fed from the voice decoder 360 into a corresponding analog signal to be delivered to a loudspeaker through an amplifier, not shown.

In this manner, the portable unit 60 according to the second embodiment has the receiver 30, which includes the demodulator 300, the A-D converter 310, the deslotting unit 320, the FACCH error correction decoder 330, the voice error correction decoder 340, the quality evaluation unit 350, the voice decoder 360 and the D-A converter 370. The quality evaluation unit 350 evaluates the quality of a decoded signal from the decoders 330 and 340, and a result of evaluation is delivered to the call control processor 40.

The operation of the transmitter 20 of the portable unit 60 constructed in the manner mentioned above will now be described.

The A-D converter 100 samples the aural signal input from the microphone, and delivers a digital aural signal to the sound presence detector 110 and the voice encoder 120. The voice encoder 120 provides a compression encoding of the aural signal, and delivers as an output a voice compressed signal which comprises encoded blocks each having a period of 20 ms, for example. The sound presence detector 110 determines whether the aural signal input from the A-D converter 100 is in the sound presence state or in the silent state, and conveys a result of determination to the switch unit 130.

It is assumed that the period with which the sound presence state is detected is chosen to be the same as the period with which the aural signal is encoded into blocks or an integral multiple thereof. The technique to detect the sound presence state is based on the power level calculation, but the beginning or the end of a word may be processed in any suitable manner.

The call control processor 40 conveys FACCH information to be transmitted, a permissible waiting time (a permissible number of waiting slots) and a result of evaluation of the quality of the decoded signal to the switch unit 130.

FIG. 4 is a flow chart illustrating the operation of the switch unit 130 of the transmitter 20 of FIG. 3. The program shown is started every 20 ms. It is to be noted that the steps where a similar operation takes place as shown in FIG. 2 are designated by the same reference numerals and characters as before.

Initially, at step ST10, it is examined whether or not there is a command from the call control processor 40 to transmit FACCH. If such command is found, the operation proceeds to step ST11 where the operation is switched to the FACCH error correction encoder 150 and then proceeds to step ST14.

If it is found at step ST10 that there is no command from the call control processor 40 to transmit FACCH, the operation branches to step ST12 where a flag, representing a result of determination rendered concerning the sound presence state, is examined. If the flag indicates the sound presence state, the operation proceeds to step ST13 where the operation switches to the voice error correction encoder 160, and then proceeds to step ST14.

At step ST14, a power amplifier normal transmission control is established in which a normal transmission time is set up during which the power amplifier 200 is turned on, and subsequently the operation proceeds to step ST15 where the period counter 140 is restarted, whereupon one pass of the program is completed.

On the other hand, if the silent state is found as a result of examination of the flag which takes place at step ST12, it is then determined whether "0" is conveyed from the period counter 140 at step ST16. If there is "0" conveyed from the period counter 140, a determination is made at step ST20 whether the channel quality is or is not faulty. If the channel quality is faulty, the established period is shortened at step ST21, while if the channel quality is good, the established period is lengthened at step ST22, the operation subsequently proceeding to step ST17.

At step ST17, the period which is established at either step ST21 or step ST22 is written into the period counter 140. At step ST18, a short slot is formed in accordance with the established period, and at step ST19, a power amplifier reduced transmission control is established in which a reduced transmission time is set up during which the power amplifier 200 is turned on, whereupon one pass through the program is completed.

In the event there is no "0" conveyed from the period counter 140 at step ST16, the program is directly completed at that point.

In this manner, the switch unit 130 controls the intermittent transmission such that a normal burst is transmitted during transmission time for control information when the sound presence state is detected, and when a no-transmission time exceeds a preset value, a short burst containing transmission time interval information is transmitted. In addition, a variable transmission time interval is provided so that when the channel quality is faulty, an established period is shortened while when the channel quality is good, an established period is lengthened in accordance with the signal level of a received waveform, a bit error rate and a frame error rate.

Returning to FIG. 3, the FACCH error correction encoder 150 effects a calculation of error detection CRC coefficients, a convolution encoding and an interleave conversion. The voice error correction encoder 160 also effects a calculation of error detection CRC coefficience, a convolution encoding and an interleave conversion. The period with which the error detection, the error correction and the interleave conversion take place in the two types of encoders may be chosen in any suitable manner.

The slotting unit 170 effects a slot interleave conversion and a TDMA slotting operation in which sync pattern, SACCH and CDVCC are added to the error corrected information.

The D-A converter 180 converts a bit train formed in the slotting unit 170 into a π/4 QPSK baseband signal, which is modulated in the RF assembly 190.

As described, in the portable unit 60 according to the second embodiment, the time interval between intermittent transmissions is changed on the basis of a result of evaluation of the quality which is conveyed from the call control processor 40. Accordingly, it is a simple matter for the base station to identify the presence of a mobile station, thus facilitating the reception of bursts which are intermittently transmitted and also improving the effectiveness of the AGC control, AFC control and burst location during the reception of the bursts by the base station.

The intermittent transmission control system described in the above embodiments is applicable to the cellular portable telephone system as mentioned, but its application is not limited thereto, and its also applicable to any arrangement (such as mobile communication terminal, for example) which involves a burst transmission.

It is also to be noted that the types of the A-D converter, the voice encoder, the slotting unit and the D-A converter which constitute the intermittent transmission control system as well as the sampling and encoding/decoding schemes are not limited to the precise form disclosed in the embodiments.

An evaluation which takes place in the quality evaluation unit 350 of the second embodiment may comprise a technique based on a frame error rate in which CRC coefficience of a decoded signal is monitored to evaluate the quality of a received signal, a technique based on a bit error rate in which a decoded signal is encoded again to monitor a bit error rate in order to evaluate the quality of a received signal, or a technique based on a received signal level in which the received signal level is monitored to evaluate the quality of the received signal. Alternatively, a combination of these techniques may also be used.

The invention being thus described, it will be obvious that the same may be varied in many ways. Such variations are not to be regarded as a departure from the spirit and scope of the invention, and all such modifications as would be obvious to one skilled in the art are intended to be included within the scope of following claims.

What is claimed is:

1. An intermittent transmission control system based on a TDMA system which involves a burst transmission, comprising:

a sound presence detector for detecting presence or absence of sound information to be transmitted on the basis of an aural signal;

a switch unit for switching types of said burst transmission; and a control processor for causing said switch unit to switch said types of said burst transmission in such a way that a normal burst transmission containing said sound information is performed if presence of said sound information is detected by said sound presence detector, whereas a reduced burst transmission containing time interval information of said burst transmission is performed if no burst transmission is performed for a predetermined time.

2. An intermittent transmission control system of claim 1, wherein said control processor causes said switch unit to switch said types of said burst transmission in such a way that said normal burst transmission containing Fast Associated Control Channel information is performed.

3. An intermittent transmission control system of claim 1, further comprising:

a voice encoder for compression encoding said aural signal;

a period counter which operates with a period which is established by said switch unit;

an FACCH error correction encoder for performing an error correction encoding for Fast Associated Control Channel;

a voice error correction encoder for performing an error correction encoding for said aural signal; and a slotting unit for applying a slot interleave conversion and a TDMA slotting operation to signals for which the error correction encoding for Fast Associated Control Channel has been performed by said FACCH error correction encoder and for which the error correction encoding for said aural signal has been performed by said voice error correction encoder.

4. An intermittent transmission control system of claim 1, further comprising:

a receiver for receiving a radio signal; and a quality evaluation unit for evaluating quality of said received signal;

wherein said control processor changes said predetermined time on the basis of a result of evaluation by said quality evaluation unit, thereby changing said time interval between said reduced burst transmissions.

5. An intermittent transmission control system of claim 4, further comprising a decoder for decoding said radio signal;

wherein said quality evaluation unit evaluates the quality of said received radio signal by at least one of a technique based on a frame error rate in which cyclic redundancy check coefficients of said decoded signal is monitored, a technique based on a bit error rate in which said decoded signal is encoded again to monitor a number of bit errors, and a technique based on a level of said received radio signal.

6. An intermittent transmission control system of claim 3, wherein said switch unit establishes a period for said period counter which is the same as said time interval between said reduced burst transmissions, and if presence of said sound information to be transmitted is not detected by said sound presence detector and no burst transmission is performed for said predetermined time, said reduced burst transmission is performed.

7. An intermittent transmission control system of claim 3, wherein said sound presence detector detects presence or absence of said sound information to be transmitted periodically with a period which is the same as a period with which said aural signal is encoded into blocks or an integral multiple thereof.

8. An intermittent transmission control system of claim 1, further comprising:

an A-D converter for sampling said aural signal and converting said aural signal into digital aural signal.

9. An intermittent transmission control system of claim 3, further comprising:

a D-A converter for converting a train of digital bits which are delivered from said slotting unit into a π/4 QPSK baseband signal; and an RF assembly for modulating said π/4 QPSK baseband signal into a signal having a radio frequency for transmission.

* * * * *